US012663883B2

(12) United States Patent
Yoshitomi

(10) Patent No.: US 12,663,883 B2
(45) Date of Patent: Jun. 23, 2026

(54) INFORMATION PROCESSING SYSTEM

(71) Applicant: Lenovo (Singapore) Pte. Ltd.,
Singapore (SG)

(72) Inventor: Keiichi Yoshitomi, Kanagawa (JP)

(73) Assignee: Lenovo (Singapore) Pte. Ltd.,
Singapore (SG)

( * ) Notice: Subject to any disclaimer, the term of this
patent is extended or adjusted under 35
U.S.C. 154(b) by 0 days.

(21) Appl. No.: 19/034,491

(22) Filed: Jan. 22, 2025

(65) Prior Publication Data

US 2025/0264947 A1      Aug. 21, 2025

(30) Foreign Application Priority Data

Feb. 19, 2024     (JP) .................................. 2024-022881

(51) Int. Cl.
*G06F 3/0354*          (2013.01)
*G06F 3/16*            (2006.01)
(52) U.S. Cl.
CPC .......... G06F 3/03545 (2013.01); G06F 3/167
(2013.01)
(58) Field of Classification Search
CPC ....... G06F 3/03545; G06F 3/167; G06F 3/016
See application file for complete search history.

(56) References Cited

U.S. PATENT DOCUMENTS 7,265,750 B2 *   9/2007   Rosenberg ............ A63F 13/213
345/182
8,219,936 B2 *   7/2012   Kim .................... G06F 3/04886
715/708

8,432,365 B2 *   4/2013   Kim ...................... G06F 3/0488
345/173
2002/0008691 A1 *   1/2002   Hanajima ............. G06F 3/0488
345/173
2003/0067449 A1 *   4/2003   Yoshikawa ............. G06F 3/016
345/173
2008/0278450 A1 *   11/2008   Lashina ................ G06F 3/0488
345/173
2008/0309621 A1 *   12/2008   Aggarwal ........... G06F 3/03545
345/173

(Continued)

FOREIGN PATENT DOCUMENTS

JP        2011-253266 A      12/2011
JP        2017-537395 A      12/2017

(Continued)

*Primary Examiner* — Dmitriy Bolotin
(74) *Attorney, Agent, or Firm* — Osha Bergman Watanabe
& Burton LLP

(57)                    ABSTRACT

An information processing system includes: a sensor unit
that performs detection of contact of a pen-shaped input
device with an operation target surface and presence of the
pen-shaped input device within a detection limit distance on
the operation target surface; a sound output unit that outputs
a sound corresponding to input sound data; and a sound
output control unit that inputs silent sound data to the sound
output unit in response to the sensor unit detecting a first
state in which the pen-shaped input device is detected within
the detection limit distance, and inputs audible sound data to
the sound output unit in response to the sensor unit detecting
that, after the first state, a second state in which the pen-
shaped input device is in contact with the operation target
surface has been reached.

3 Claims, 11 Drawing Sheets

(56)        References Cited

U.S. PATENT DOCUMENTS

| | | | | |
|---|---|---|---|---|
| 2009/0058829 A1* | 3/2009 | Kim | ..................... | G06F 3/0416 |
| | | | | 345/173 |
| 2013/0300590 A1* | 11/2013 | Dietz | ................. | G06F 11/3051 |
| | | | | 341/34 |
| 2014/0253478 A1 | 9/2014 | Jeong et al. | | |
| 2017/0285774 A1* | 10/2017 | Parikh | .................... | G06F 3/167 |
| 2020/0285318 A1* | 9/2020 | Taylor | .................... | G06F 3/038 |
| 2024/0176423 A1* | 5/2024 | Kang | .................... | H04R 1/028 |

FOREIGN PATENT DOCUMENTS

| | | | |
|---|---|---|---|
| JP | 2020-204814 A | 12/2020 | |
| JP | 7404584 B1 | 12/2023 | |
| WO | 2023/163114 A1 | 8/2023 | |

* cited by examiner

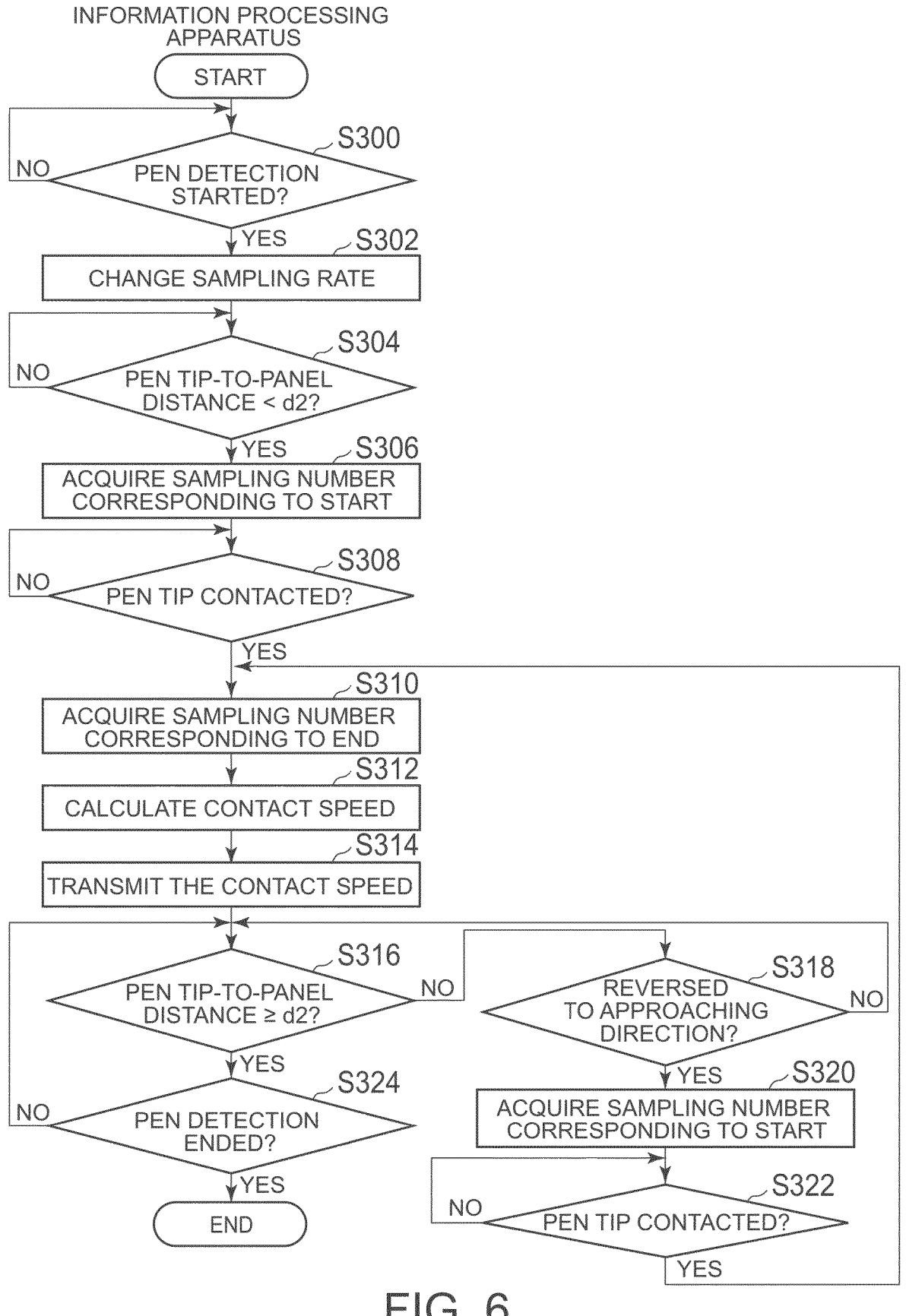

INFORMATION PROCESSING
APPARATUS

START

S300
PEN DETECTION
STARTED?
NO

YES     S302
CHANGE SAMPLING RATE

S304
PEN TIP-TO-PANEL
DISTANCE < d2?
NO

YES     S306
ACQUIRE SAMPLING NUMBER
CORRESPONDING TO START

S308
PEN TIP CONTACTED?
NO

YES

S310
ACQUIRE SAMPLING NUMBER
CORRESPONDING TO END

S312
CALCULATE CONTACT SPEED

S314
TRANSMIT THE CONTACT SPEED

S316
PEN TIP-TO-PANEL
DISTANCE ≥ d2?     NO

S318
REVERSED
TO APPROACHING
DIRECTION?     NO

YES     S324
PEN DETECTION
ENDED?
NO

YES     S320
ACQUIRE SAMPLING NUMBER
CORRESPONDING TO START

YES

END

S322
PEN TIP CONTACTED?
NO

YES

FIG. 6

INFORMATION PROCESSING SYSTEM

CROSS-REFERENCE TO RELATED APPLICATIONS

This application claims priority to Japanese Patent Application No. 2024-022881 filed on Feb. 19, 2024, the contents of which are hereby incorporated herein by reference in their entirety.

TECHNICAL FIELD

The present invention relates to an information processing system.

BACKGROUND

When inputting to an interactive display system, it is known to use, as an input device, a stylus of a pen shape (pen-shaped input device) that is capable of providing tactile feedback by driving a tactile actuator to generate vibrations. [Patent Document 1] Japanese Unexamined Patent Application Publication (Translation of PCT Application) No. 2017-537395

The vibrations generated in the pen-shaped input device provide a tactile sensation simulating the feeling of sliding the tip of a pen across a writing medium such as paper, thereby allowing the user who inputs using the pen-shaped input device to obtain a sensation similar to that of writing on a writing medium.

When inputting using a pen-shaped input device, it is preferable that the sensation is as close as possible to that of writing on an actual writing medium.

SUMMARY

One or more embodiments of the present invention ensure that the sensation similar to that of actually writing on a writing medium is not impaired when inputting using a pen-shaped input device.

An information processing system according to one or more embodiments includes: a sensor unit that performs detection of contact of a pen-shaped input device with an operation target surface and presence of the pen-shaped input device within a detection limit distance on the operation target surface; a sound output unit that outputs a sound corresponding to input sound data; and a sound output control unit that inputs silent sound data to the sound output unit in response to the sensor unit detecting a first state in which the pen-shaped input device is detected within the detection limit distance, and inputs audible sound data to the sound output unit in response to the sensor unit detecting that, after the first state, a second state in which the pen-shaped input device is in contact with the operation target surface has been reached.

One or more embodiments of the present invention ensure that the sensation similar to that of actually writing on a writing medium is not impaired when inputting using the pen-shaped input device.

BRIEF DESCRIPTION OF THE DRAWINGS

FIG. 6 is a flowchart illustrating an exemplary processing procedure performed for tactile feedback by the information processing apparatus and the pen-shaped input device in one or more embodiments;

DETAILED DESCRIPTION

Figure 1:
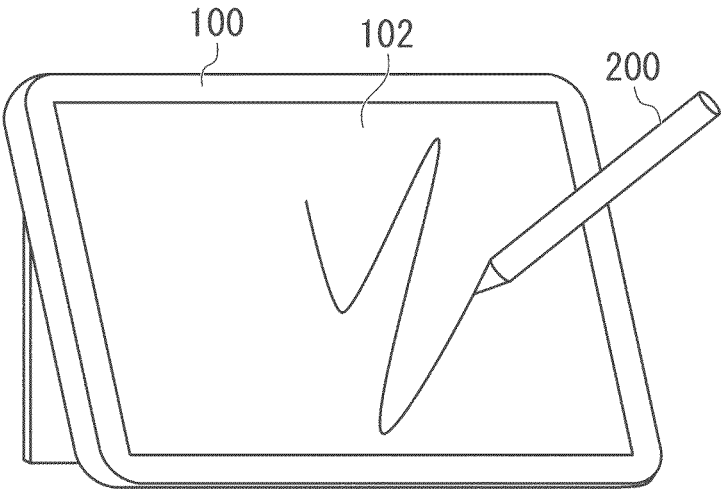
FIG. 1 shows an example of the external configuration of an information processing system in one or more embodiments.

FIG. 1 shows an example of the external configuration of an information processing system of one or more embodiments. As shown in FIG. 1, the information processing system of one or more embodiments includes an information processing apparatus 100 and a pen-shaped input device 200.

The information processing apparatus 100 is capable of executing information processing in response to an input operation performed using the pen-shaped input device 200. FIG. 1 illustrates an example where the information processing apparatus 100 is a tablet terminal or a laptop personal computer.

The information processing apparatus 100 includes a touch panel display unit 102. The touch panel display unit 102 is a unit in which a touch panel and a display unit are combined. The touch panel display unit 102 displays an image on a display surface, and enables operations by touching the display surface with a pen-shaped input device, finger, or other operating body.

The pen-shaped input device 200 is an input device of a pen shape used by a user to perform operations on the touch panel of the touch panel display unit 102 of the information processing apparatus 100. The user is allowed to perform a handwriting input operation of characters, pictures, figures, and the like by holding the pen-shaped input device 200 and moving the device such that the pen tip comes into contact with the display surface of the touch panel display unit 102.

It should be noted that the operations performed using the pen-shaped input device 200 may include pointing operations on a user interface image displayed on the touch panel display unit 102.

While the manner of detecting the pen-shaped input device 200 by the touch panel in the touch panel display unit 102 of one or more embodiments is not particularly limited, examples thereof include a capacitive type and an electromagnetic induction type. In the following description, a case of using the capacitive type will be given as an example.

The information processing apparatus 100 has installed therein an application (pen operation support application) that supports input operations using the pen-shaped input device 200.

The pen operation support application may be able to perform, for example, processing of displaying on the touch panel display unit 102 characters or pictures drawn in accordance with handwriting input operations such as inputting characters or drawing pictures performed by contacting the touch panel display unit 102 with the pen tip of the pen-shaped input device 200, processing of converting the characters or pictures drawn by the operations into data, and the like.

In the information processing system of one or more embodiments, the pen-shaped input device 200 vibrates in response to an operation for writing (writing operation) being performed on the pen-shaped input device 200. Such vibrations of the pen-shaped input device 200 provide the user with a tactile sensation similar to that of writing on a writing medium such as paper, thereby allowing the user to obtain the sensation similar to that of writing on a writing medium using an actual writing implement.

In the following description, the generation of vibrations while the writing operation is being performed using the pen-shaped input device 200 is also referred to as "tactile feedback".

Figure 2:
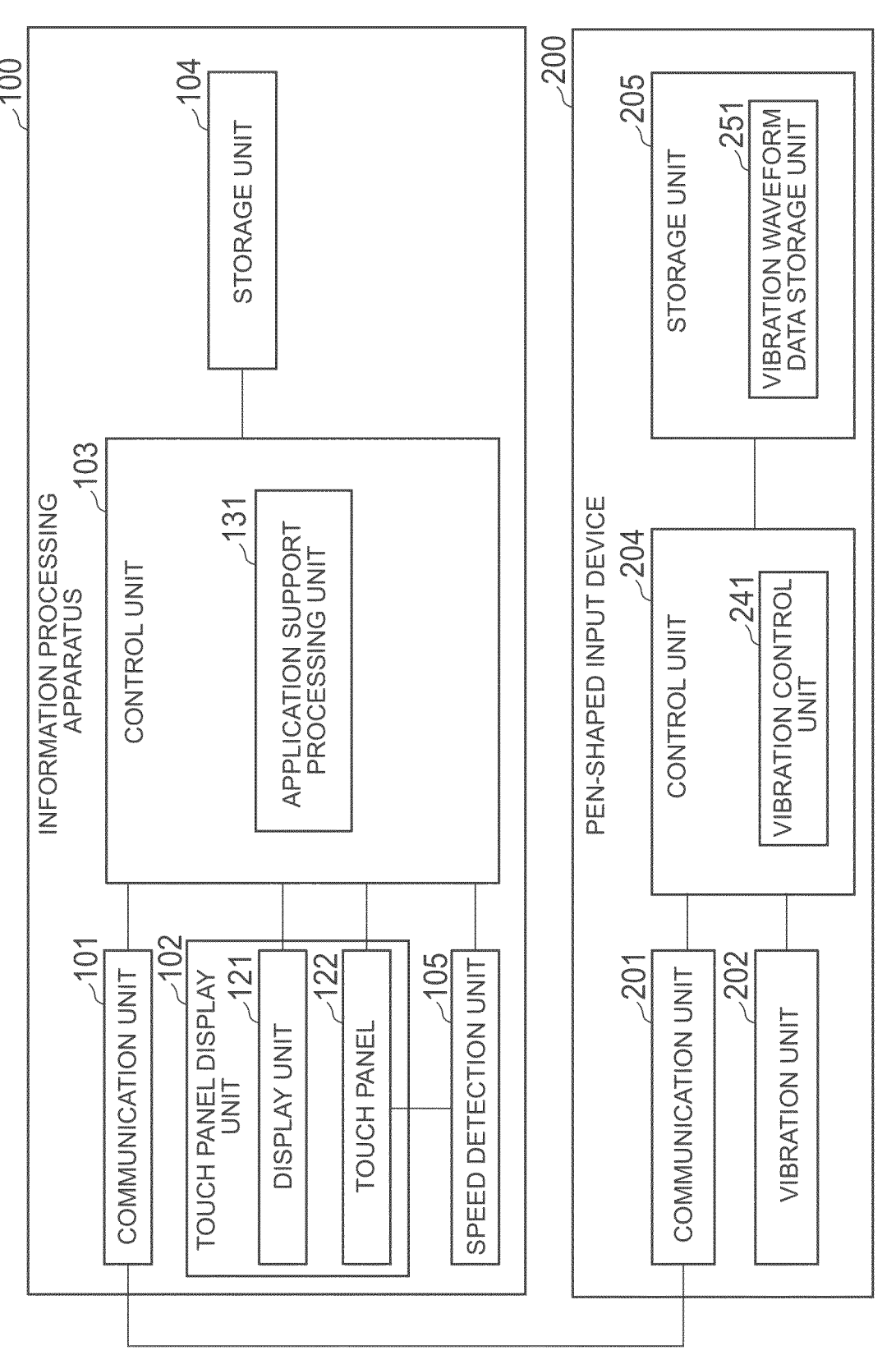
FIG. 2 shows an example of the functional configuration for tactile feedback of an information processing apparatus and a pen-shaped input device in one or more embodiments.

FIG. 2 shows an example of the functional configuration of the information processing apparatus 100 and the pen-shaped input device 200 for tactile feedback of one or more embodiments.

First, an example of the functional configuration of the information processing apparatus 100 will be described. The functions of the information processing apparatus 100 shown in FIG. 2 are implemented when a central processing unit (CPU), a graphics processing unit (GPU), and the like included in the information processing apparatus 100 as hardware execute programs.

The information processing apparatus 100 in FIG. 2 includes a communication unit 101, a touch panel display unit 102, a control unit 103, a storage unit 104, and a speed detection unit 105.

The communication unit 101 performs wireless communication with the pen-shaped input device 200. The wireless communication system supported by the communication unit 101 is not particularly limited. The communication unit 101 may be configured to support wired communication with the pen-shaped input device 200.

The touch panel display unit 102 is a device in which a display unit 121 and a touch panel 122 (an example of the sensor unit) are combined.

The display unit 121 displays images under the control of the control unit 103.

The touch panel 122, which is provided corresponding to the display surface of the display unit 121, detects the position of the pen tip of the pen-shaped input device 200, and outputs the coordinates of the detected position as pen operation information. More specifically, the touch panel

122 of the capacitive type may detect the position (coordinates) of the pen tip on the panel surface (an example of the operation target surface) by detecting, using electrodes, the capacitance generated by the contact (or approach) of the pen tip of the pen-shaped input device 200 to the panel surface.

The control unit 103 performs various controls in the information processing apparatus 100. The control unit 103 includes an application support processing unit 131 that performs processing corresponding to the pen operation support application.

While a writing operation using the pen-shaped input device 200 is being performed as an operation for the pen operation support application, pen operation information is input from the touch panel 122 to the application support processing unit 131. The application support processing unit 131 performs processing such as drawing, for example, in response to the input of the pen operation information.

The storage unit 104 stores various types of information corresponding to the information processing apparatus 100.

The speed detection unit 105 detects the speed (contact speed) at which the pen tip of the pen-shaped input device 200 comes into contact with the panel surface on the basis of a detection signal indicative of the capacitance generated on the touch panel 122 in accordance with the approach or contact of the pen-shaped input device 200 to the panel surface.

It should be noted that the speed detection unit 105 may be included in the touch panel display unit 102 or in the control unit 103.

Next, an example of the functional configuration of the pen-shaped input device 200 will be described. The functions of the pen-shaped input device 200 shown in FIG. 2 may be implemented, for example, by causing a micro controller unit (MCU) or other microprocessor included in the pen-shaped input device 200 as hardware to execute programs.

The pen-shaped input device 200 in FIG. 2 includes a communication unit 201, a vibration unit 202, a control unit 204, and a storage unit 205.

The communication unit 201 is communicably connected to the communication unit 101 of the information processing apparatus 100.

The vibration unit 202 (actuator) is a unit that vibrates so as to provide a user holding the pen-shaped input device 200 with a tactile sensation during a writing operation. The vibrations of the vibration unit 202 are controlled by a vibration control unit 241.

The control unit 204 performs various controls in the pen-shaped input device 200. The control unit 204 includes the vibration control unit 241.

The vibration control unit 241 causes the vibration unit 202 to vibrate on the basis of vibration waveform data stored in a vibration waveform data storage unit 251.

The storage unit 205 stores various types of information corresponding to the pen-shaped input device 200. The storage unit 205 includes the vibration waveform data storage unit 251. The vibration waveform data storage unit 251 stores vibration waveform data. The vibration waveform data is data that indicates a vibration waveform for generating a desired vibration state in the pen-shaped input device 200.

The pen-shaped input device 200 of the information processing system of one or more embodiments having the above configuration is capable of providing tactile feedback. In other words, the pen-shaped input device 200 of one or more embodiments is operable to vibrate in response to an operation for writing being performed in the state where the pen tip is in contact with the panel surface of the touch panel display unit 102 (the touch panel 122). With the pen-shaped input device 200 thus vibrated when a writing operation is being performed, it is possible to make the sensation similar to that of writing on a writing medium using an actual writing implement. For such tactile feedback, it is preferable that the vibration can be controlled such that, for example, the intensity of the vibration is changed in accordance with the strength (contact strength) with which the pen-shaped input device 200 contacts the panel surface, which will make the sensation even more similar to that of writing on a writing medium using an actual writing implement.

Thus, in the information processing system of one or more embodiments, it is configured to detect the speed (panel contact speed) at which the tip (pen tip) of the pen-shaped input device 200 contacts the panel surface of the touch panel 122 by a user operation. As the contact speed increases, the contact strength also increases, so there is a correlation between the contact speed and the contact strength. This means that the panel contact speed can be treated as the contact strength of the pen-shaped input device 200 against the panel surface of the touch panel 122. Therefore, for a vibration to be generated at the time of contact with the panel surface of the touch panel 122, the pen-shaped input device 200 of one or more embodiments is configured to vibrate at an intensity corresponding to the detected contact speed.

An exemplary technique for detecting the contact speed in one or more embodiments will be described with reference to FIG. 3. In the touch panel 122 of the capacitive type of one or more embodiments, even if a pen tip 210 of the pen-shaped input device 200 is not in contact with a panel surface 1221, a change in capacitance occurs in the state where the pen tip 210 is present within a certain detectable range d1 from the panel surface 1221, so that the position of the pen tip 210 can be detected and a detection signal can be output. The capacitance changes depending on the distance of the pen tip 210 from the panel surface 1221 within the detectable range d1.

When a user is to begin writing on the panel surface 1221 using the pen-shaped input device 200, the user brings the pen tip 210 of the pen-shaped input device 200 into contact with the panel surface 1221. FIG. 3 shows the changes in the positional relationship between the pen tip 210 and the panel surface 1221 over time as the user attempts to bring the pen tip 210 into contact with the panel surface 1221.

When the user attempts to bring the pen tip 210 of the pen-shaped input device 200 into contact with the panel surface 1221, the pen tip 210 of the pen-shaped input device 200 is made to approach the panel surface 1221 from a state in which the pen tip 210 is separated from the panel surface 1221 by a certain distance.

Figure 3:
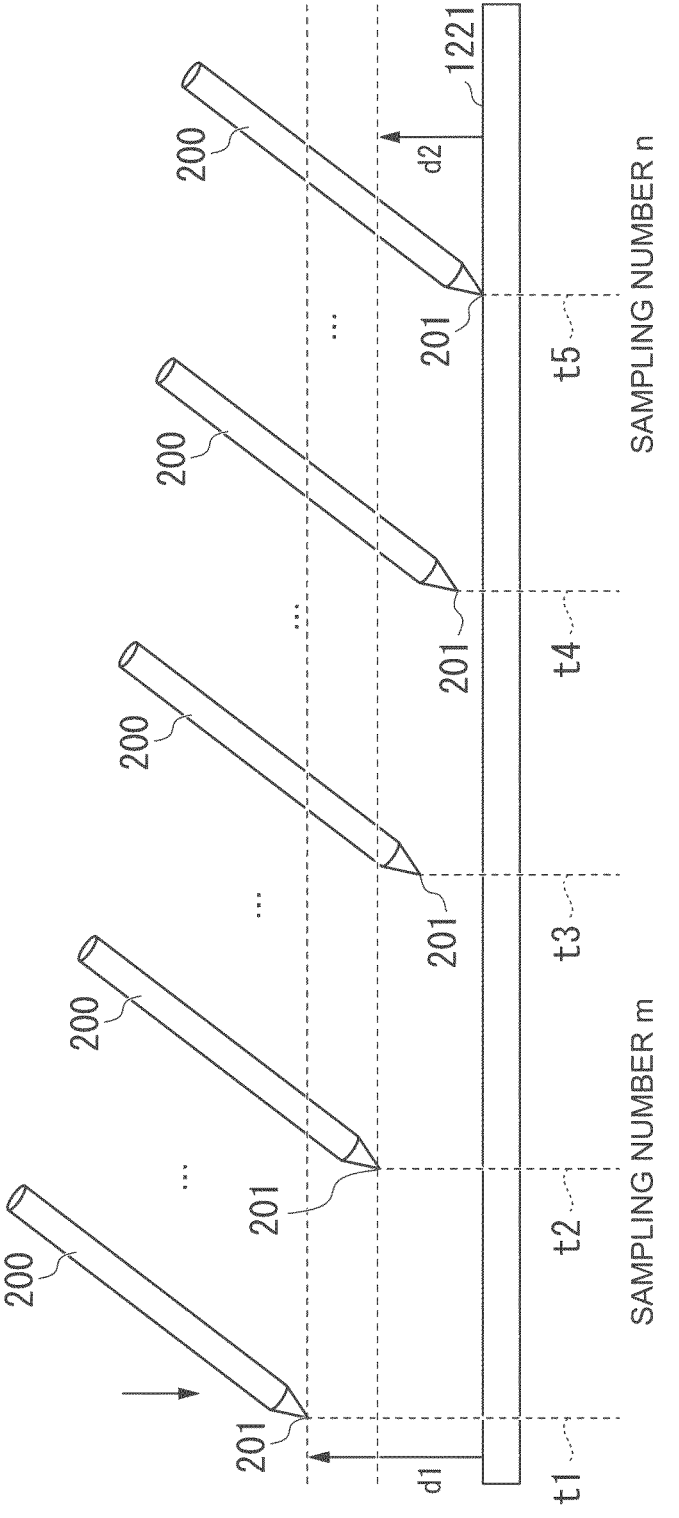
FIG. 3 illustrates an exemplary technique for detecting a contact speed in one or more embodiments.

In FIG. 3, first, the pen-shaped input device 200 is made to approach the panel surface 1221 from a position farther than the detectable range d1 from the panel surface 1221, and the pen tip 210 reaches the detectable range d1 at time t1.

In one or more embodiments, a speed detection target range d2 is also defined. The speed detection target range d2 is a range up to a predetermined distance from the panel surface 1221 that is shorter than the detectable range d1.

After time t1, the pen-shaped input device 200 is made to approach the panel surface 1221, and the pen tip 210 reaches the speed detection target range d2 at time t2. The touch panel 122 is configured to detect (sample) operations on the panel surface 1221 at a predetermined sampling rate. The sampling number for the sampling at time t2 was "m". The sampling number is, for example, the number assigned so as to be incremented each time a sampling is performed. Thus, the sampling number m corresponding to the time at which the pen tip 210 reaches the speed detection target range d2 is the sampling number corresponding to the time at which the pen tip 210 is at the speed detection start position.

After time t2, as indicated as the time lapse through times t3 and t4, the pen tip 210 of the pen-shaped input device 200 is continuously made to approach the panel surface 1221. During this time, the capacitance generated on the touch panel 122 changes in accordance with the distance of the pen tip 210 from the panel surface 1221.

After time t4 as well, the pen tip 210 of the pen-shaped input device 200 is continuously made to approach the panel surface 1221, and at time t5, the pen tip 210 comes into contact with the panel surface 1221. The sampling number at this time was "n". The speed detection unit 105 may determine whether the pen tip 210 has come into contact with the panel surface 1221 in accordance with, for example, whether a capacitance that is generated in response to the state where the pen tip 210 is in contact with the panel surface 1221 has been obtained. Thus, the sampling number n corresponding to the time at which the pen tip 210 comes into contact with the panel surface 1221 is the sampling number corresponding to the time at which the pen tip 210 is at the speed detection end position.

In response to the pen tip 210 coming into contact with the panel surface 1221, the speed detection unit 105 detects a contact speed of the pen-shaped input device 200. The speed detection unit 105 can calculate the contact speed by dividing the speed detection target range d2 by the time (corresponding to the duration from time t2 to time t5) taken by the pen tip 210 to move through the speed detection target range d2. More specifically, the speed detection unit 105 may calculate a contact speed V using, for example, the following expression 1. In the expression 1, sr is the sampling rate, m is the sampling number corresponding to the speed detection start position, and n is the sampling number corresponding to the speed detection end position.

$$V = d2 \times sr/(n - m) \qquad \text{(Expression 1)}$$

It should be noted that in the state in which the presence of the pen tip 210 is detected within the detectable range d1 or within the speed detection target range d2, for example, the sampling rate of the touch panel 122 may be changed to a predetermined sampling rate higher than that set for the state in which the pen tip 210 is not detected. With the sampling rate changed in this manner, the error between the sampling timing of the sampling number m and the timing at which the pen tip 210 has actually reached the speed detection start position, and the error between the sampling timing of the sampling number n and the timing at which the pen tip 210 has actually touched the panel surface 1221 can be reduced. The timing errors thus reduced can also improve the accuracy of the detected contact speed.

An exemplary processing procedure performed for tactile feedback by the information processing apparatus 100 and the pen-shaped input device 200 of one or more embodiments will be described with reference to the flowchart of FIG. 4.

First, an exemplary processing procedure performed by the information processing apparatus 100 will be described.

Step S100: In the information processing apparatus 100, the speed detection unit 105 waits for the start of detection of the pen tip 210 by the touch panel 122. The speed detection unit 105 may determine that the detection of the pen tip 210 has been started in response to a capacitance being generated on the touch panel 122 in response to the pen tip 210 reaching the detectable range d1, as at time t1 in FIG. 3, and the output of a detection signal according to the generated capacitance being started.

Step S102: In response to the start of detection of the pen tip 210 by the touch panel 122, the speed detection unit 105 changes the sampling rate of the touch panel 122 to a higher level. That is, the processing in FIG. 4 shows the example in which the sampling rate is changed in response to the state in which the pen tip 210 is present in the detectable range d1.

Step S104: After the processing in step S102, the speed detection unit 105 waits for the distance from the pen tip 210 to the panel surface 1221 (pen tip-to-panel distance) to become smaller than the speed detection target range d2. That is, the speed detection unit 105 waits for a change from the state corresponding to time t1 to the state corresponding to time t2 in FIG. 3.

It should be noted that there may be a case in which, while waiting in step S104, the pen tip 210 returns to the state of being outside the detectable range d1 without the pen tip-to-panel distance becoming smaller than the speed detection target range d2. In such a case, the processing in FIG. 4 may be terminated after the sampling rate changed in step S102 is returned to the default state.

Step S106: The speed detection unit 105 acquires the sampling number m indicating the sampling that has been performed at the time when the pen tip-to-panel distance falls below the speed detection target range d2. The sampling number m is the sampling number corresponding to the speed detection start position.

Step S108: Next, the speed detection unit 105 waits for the pen tip 210 to contact the panel surface 1221.

It should be noted that there may be a case in which, while waiting in step S108, the pen tip 210 returns to the state of being outside the detectable range d1 without contacting the panel surface 1221. In such a case, the processing in FIG. 4 may be terminated after the sampling rate changed in step S102 is returned to the default state.

Step S110: The speed detection unit 105 acquires the sampling number n indicating the sampling that has been performed at the time when it is determined that the pen tip 210 has come into contact with the panel surface 1221. The sampling number n is the sampling number corresponding to the speed detection end position.

Step S112: The speed detection unit 105 calculates the contact speed using the expression 1, for example, by using the sampling number m corresponding to the speed detection start position acquired in step S106 and the sampling number n corresponding to the speed detection end position acquired in step S110.

Step S114: The speed detection unit 105 causes the communication unit 101 to transmit the contact speed calculated in step S112 to the pen-shaped input device.

Next, an exemplary processing procedure performed by the pen-shaped input device 200 will be described.

Step S200: In the pen-shaped input device 200, the communication unit 201 receives the contact speed transmitted from the information processing apparatus 100 in step S114.

Step S202: In the pen-shaped input device 200, the vibration control unit 241 sets, on the basis of the contact speed received in step S200, a vibration intensity when vibrating the pen-shaped input device 200 in response to the time when the pen tip 210 comes into contact with the panel surface 1221.

Step S204: The vibration control unit 241 uses the vibration waveform data stored in the vibration waveform data storage unit 251 to drive the vibration unit 202 with the vibration intensity set in step S202. With the vibration unit 202 thus being vibrated, the pen-shaped input device 200 vibrates at the time when the pen tip 210 comes into contact with the panel surface 1221 and at the intensity corresponding to the contact strength.

After the user brings the pen tip 210 of the pen-shaped input device 200 into contact with the panel surface 1221, the user can perform the writing operation of moving the pen tip 210 while keeping the pen tip in contact with the panel surface 1221. In this case, tactile feedback according to the movement of the pen tip 210 is provided to the pen-shaped input device 200, although the corresponding processing is not shown in the figure.

Additional embodiments will now be described. While a user is performing a writing operation after making the pen tip 210 of the pen-shaped input device 200 once brought into contact with the panel surface 1221, the user may make the pen tip 210 slightly away from the panel surface 1221 and then contact the panel surface 1221 again. In this case, the pen tip 210 may contact the panel surface 1221 after being separated from the panel surface 1221 within a range smaller than the speed detection target range d2. In such a case, the pen tip 210 contacts the panel surface 1221 without moving out of the detectable range d1, so the processing in step S106 onwards in the exemplary processing procedure of FIG. 4 is not performed, which hinders the detection of the contact speed.

Therefore, one or more embodiments are configured such that the contact speed can be appropriately detected in accordance with the movement of the pen tip 210 within a range smaller than the speed detection target range d2.

An exemplary technique for detecting the contact speed according to the movement of the pen tip 210 within a range smaller than the speed detection target range d2 will be described with reference to FIG. 5.

Figure 5:
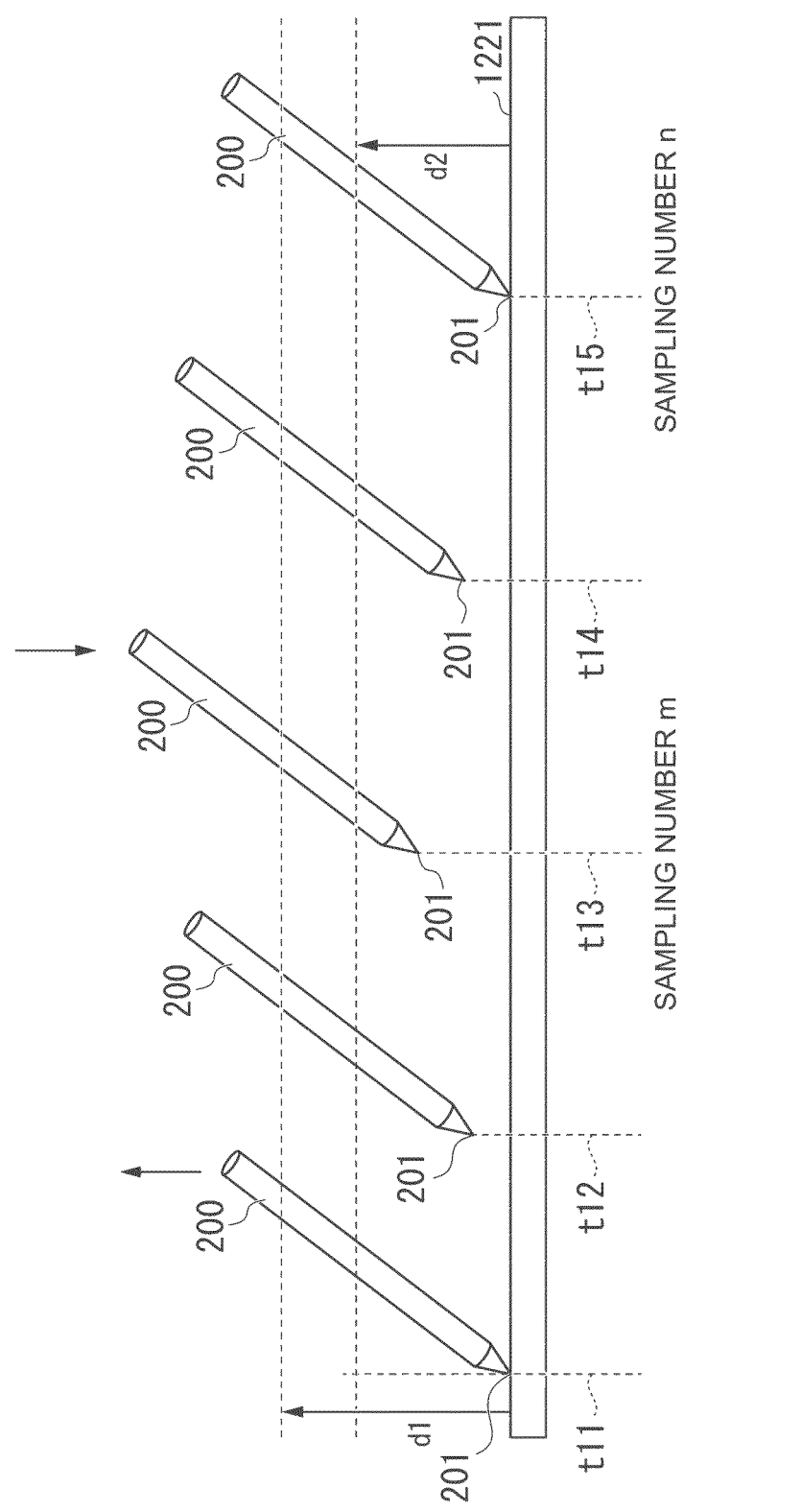
FIG. 5 illustrates an exemplary technique for detecting the contact speed in one or more embodiments.

For example, time t11 in FIG. 5 is the time at which a certain period of time has elapsed since the contact state of the pen tip 210 at time t5 in FIG. 3. During the period from time t5 to time t11, the pen tip 210 is maintained in the state of contact with the panel surface 1221. It should be noted that during the period from time t5 to time t11, the pen tip 210 may be moved on the panel surface 1221 according to the writing operation, for example.

At time t11, the user begins to move the pen tip 210 away from the panel surface 1221. During the period from t11 through time t12 to reach time t13, the pen tip 210 is moved in a direction (separating direction) away from the panel surface 1221, and the distance (separation distance) from the panel surface 1221 gradually increases with time. In the speed detection unit 105, the distance from the panel surface 1221 to the pen tip 210 is grasped on the basis of a detection signal indicative of a change in capacitance generated on the touch panel 122 in accordance with the distance from the panel surface 1221 to the pen tip 210.

When time t13 is reached, the user reverses the direction of movement of the pen tip 210 up to that time and begins to move the pen tip 210 in a direction (approaching direction) of approaching the panel surface 1221. After time t13, the pen tip 210 moves to approach the panel surface 1221, and when time t15 is reached through time t14, the pen tip 210 comes into contact with the panel surface 1221.

In response to such a movement of the pen tip 210, the speed detection unit 105 determines that the moving direction of the pen tip 210 has been reversed from the separating direction to the approaching direction at time t13, within the range smaller than the speed detection target range d2. The speed detection unit 105 acquires a sampling number m corresponding to the speed detection start position at the time when the moving direction of the pen tip 210 is reversed from the separating direction to the approaching direction. The speed detection unit 105 also acquires a sampling number n corresponding to the speed detection end position at time t15 at which the pen tip 210 contacts the panel surface 1221. The speed detection unit 105 uses the thus acquired sampling numbers m and n and the distance between the pen tip 210 and the panel surface 1221 at time t13 at which the moving direction of the pen tip 210 is reversed from the separating direction to the approaching direction, to calculate the contact speed using the expression 1. In this manner, the speed detection unit 105 of one or more embodiments is enabled to detect the contact speed at the time when the pen tip 210 contacts the panel surface 1221 within a range smaller than the speed detection target range d2.

An exemplary processing procedure performed by the information processing apparatus 100 of one or more embodiments for the detection of a contact speed will be described with reference to the flowchart of FIG. 6.

Figure 4:
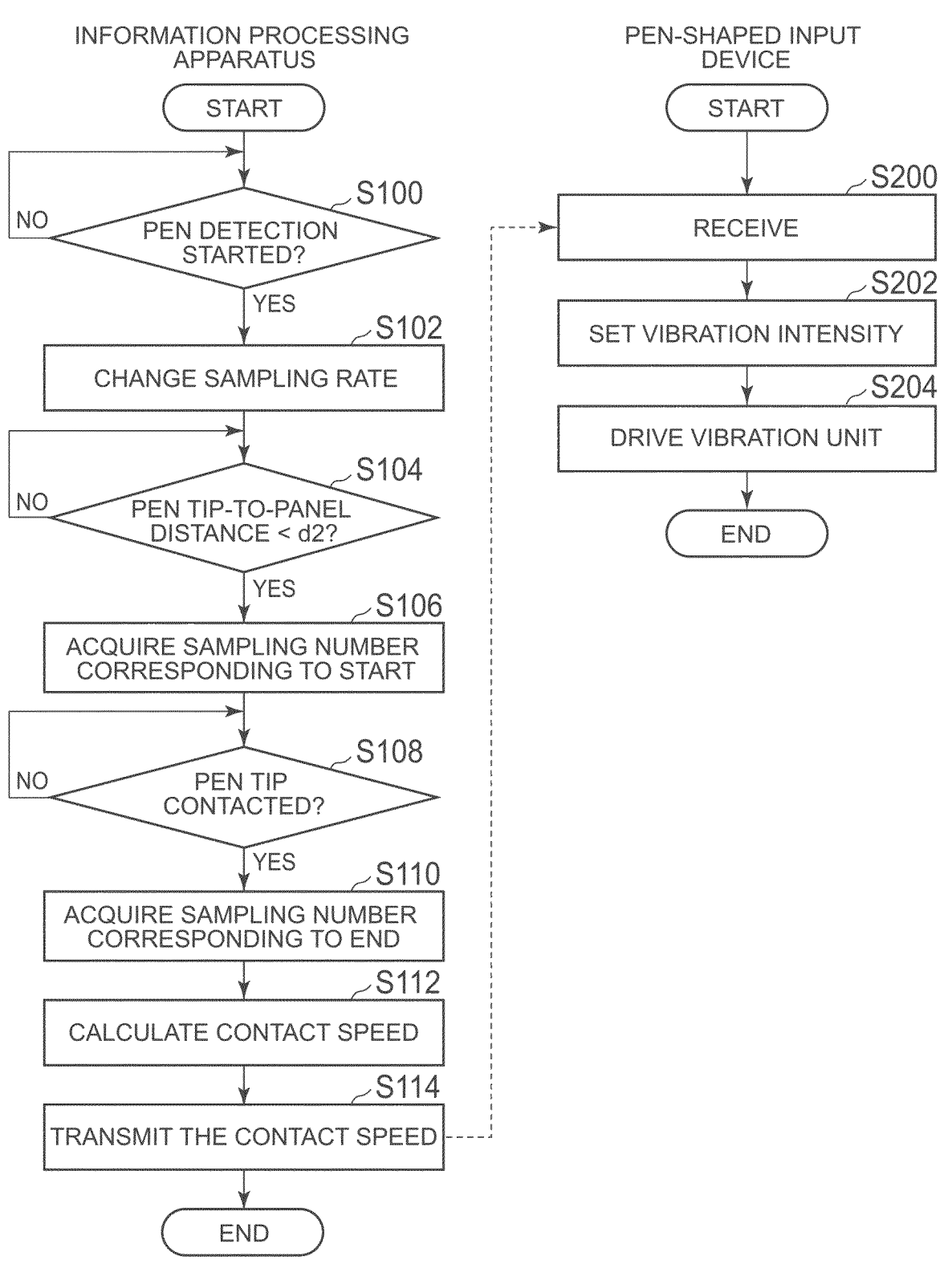
FIG. 4 is a flowchart illustrating an exemplary processing procedure performed for tactile feedback by the information processing apparatus and the pen-shaped input device in one or more embodiments.

The processing in steps S300 to S314 in FIG. 6 is identical to that in steps S100 to S114 in FIG. 4.

Step S316: In the processing in steps S300 to S314, detection of a contact speed in response to the pen tip moved from outside the detectable range d1 coming into contact with the panel surface 1221, as shown in FIG. 3, and transmission of the contact speed are performed. In response to the transmission of the contact speed, the processing in steps S200 to S204 in FIG. 4 is performed, so that the tactile feedback is provided to cause the pen-shaped input device 200 to vibrate at an intensity corresponding to the contact speed at the time when the device contacts the panel surface 1221.

Then, in one or more embodiments, the processing in step S316 is performed in which the speed detection unit 105 determines whether the pen tip-to-panel distance has become equal to or greater than the speed detection target range d2 with the subsequent writing operation by the user.

S318: In the state where the pen tip-to-panel distance is smaller than the speed detection target range d2, the speed detection unit 105 determines whether the moving direction of the pen tip 210 has been reversed from the separating direction to the approaching direction, as illustrated as time t13 in FIG. 5.

If it is determined that the moving direction of the pen tip 210 has not been reversed from the separating direction to the approaching direction, the process returns to step S316.

Step S320: If it is determined in step S318 that the moving direction of the pen tip 210 has been reversed from the separating direction to the approaching direction, the speed detection unit 105 acquires a sampling number m, indicating the sampling performed on the touch panel 122 in response to the timing of the reversal to the approaching direction, as the sampling number corresponding to the speed detection start position.

Step S322: After the processing in step S320, the speed detection unit 105 waits for the pen tip 210 to contact the panel surface 1221. In this case as well, if, during the waiting in step S322, the pen tip 210 returns to the state of being outside the detectable range d1 without contacting the panel surface 1221 as in step S108 of FIG. 4, the processing of FIG. 6 may be terminated after the sampling rate changed in step S302 is returned to the default state.

When the pen tip 210 comes into contact with the panel surface 1221, the speed detection unit 105 returns the process to step S310. In this case, by the speed detection unit 105 performing the processing in steps S310 to S314, the contact speed when the pen tip 210 contacts the panel surface 1221 in the state where the pen tip-to-panel distance is within the range smaller than the speed detection target range d2 is detected, and the detected contact speed is transmitted to the pen-shaped input device 200. The pen-shaped input device 200 performs processing in steps S200 to S204 (FIG. 4) in response to the transmitted contact speed. In this manner, the pen-shaped input device 200 is caused to vibrate at the time when the pen tip 210 contacts the panel surface 1221 and in accordance with the strength with which the pen tip 210 contacts the panel surface 1221.

Step S324: If it is determined in step S316 that the pen tip-to-panel distance has become equal to or greater than the speed detection target range d2, the speed detection unit 105 determines whether the detection of the pen tip 210 on the touch panel 122 has ended. In the state where the pen tip 210 is outside the detectable range d1 and no capacitance is generated on the panel surface 1221 and no detection signal according to the capacitance is output, it is determined that the detection of the pen tip 210 has ended. If it is determined that the detection of the pen tip 210 has not ended, the process returns to step S316.

If it is determined that the detection of the pen tip 210 has ended, the processing in FIG. 6 is terminated. In terminating the processing in FIG. 6, the sampling rate of the touch panel 122 changed in step S302 is returned to the default state.

Additional embodiments will now be described. In the information processing system of one or more embodiments, the pen-shaped input device 200 is configured to be capable of outputting, in addition to the vibrations according to the tactile feedback, sounds (writing sounds), generated when writing on a writing medium using an actual writing implement, in response to a writing operation being performed. Outputting writing sounds according to writing operations performed using the pen-shaped input device 200 in this manner is also referred to as "writing sound feedback".

With the writing sound feedback thus provided, it is possible to make the sensation of writing on the touch panel 122 using the pen-shaped input device 200 even more similar to that of writing on a writing medium using an actual writing implement.

Figure 7:
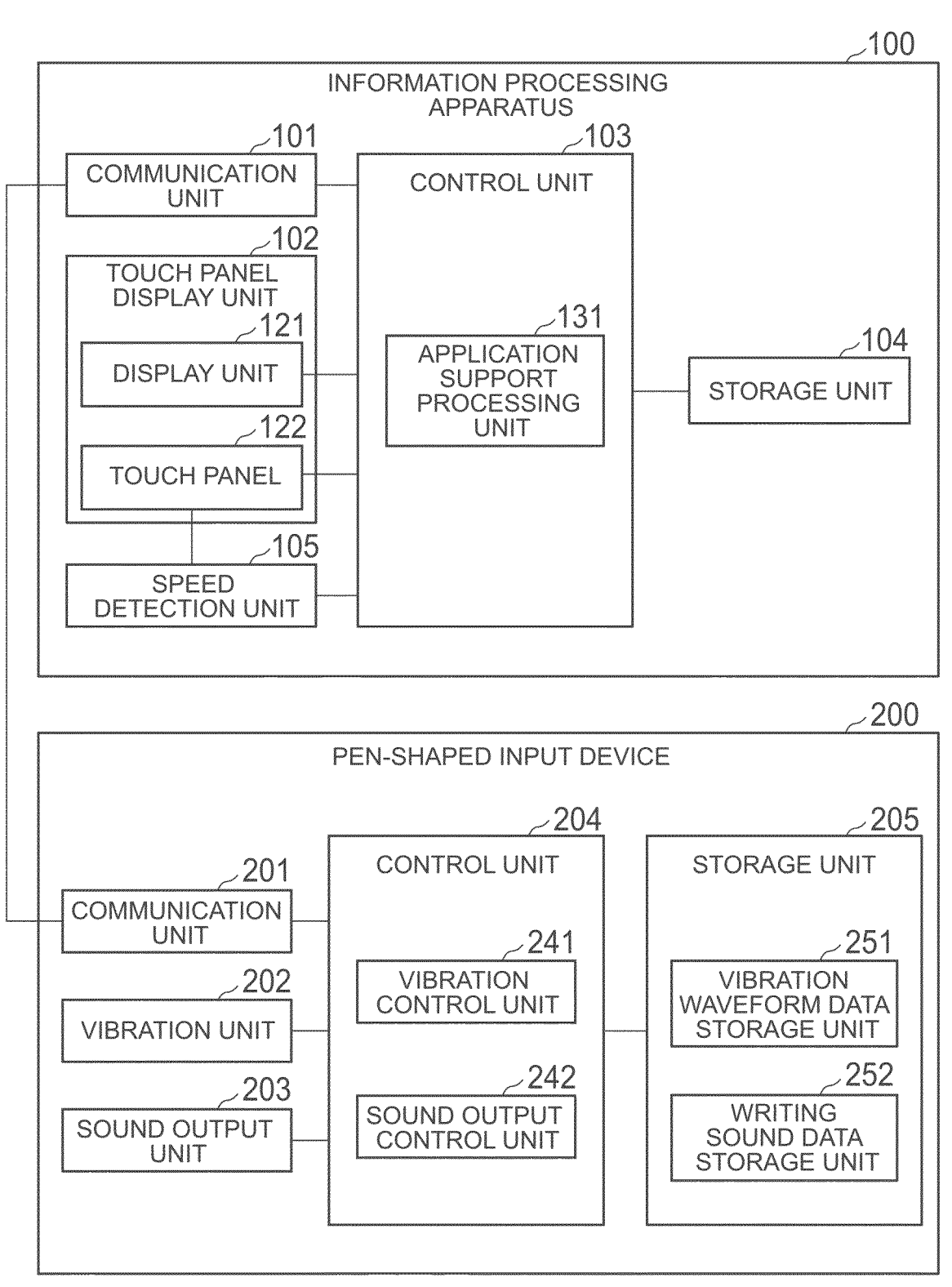
FIG. 7 shows an example of the functional configuration for tactile and writing sound feedback of the information processing apparatus and the pen-shaped input device in one or more embodiments.

FIG. 7 shows an example of the functional configuration of the information processing apparatus 100 and the pen-shaped input device 200 for tactile and writing sound feedback of one or more embodiments. In FIG. 7, the portions identical to those in FIG. 2 are designated by the same reference numerals and the description thereof is not repeated. The differences from FIG. 2 will be primarily described.

The configuration of the information processing apparatus 100 of FIG. 7 is identical to that of FIG. 2.

The pen-shaped input device 200 of FIG. 7 includes a sound output unit 203. The pen-shaped input device 200 of FIG. 7 also includes a sound output control unit 242 in the control unit 204, and a writing sound data storage unit 252 in the storage unit 205.

The sound output unit 203 includes, for example, a speaker, and outputs writing sounds under the control of the sound output control unit 242. The sound output unit 203 may be configured to also be capable of outputting electronic sounds, voices, and other sounds.

The sound output control unit 242 inputs audio data, which is writing sound data stored in the writing sound data storage unit 252, to the sound output unit 203, thereby causing the writing sounds to be output from the sound output unit 203.

The writing sound data storage unit 252 stores the writing sound data. The writing sound data is audio data generated so as to reproduce the writing sound.

In one or more embodiments, the information processing apparatus 100 may be configured to perform processing similar to that shown in FIG. 4 or FIG. 6 as the processing for tactile and writing sound feedback.

Figure 8:
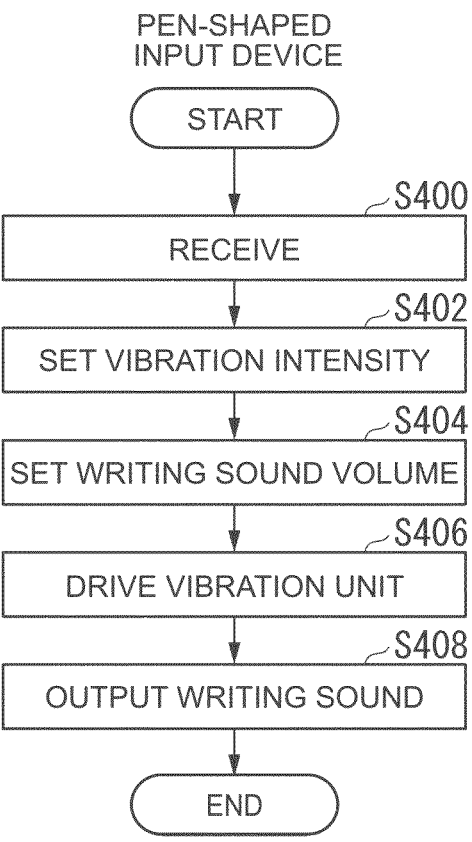
FIG. 8 is a flowchart illustrating an exemplary processing procedure performed for tactile and writing sound feedback by the pen-shaped input device in one or more embodiments.

The flowchart of FIG. 8 illustrates an exemplary processing procedure performed by the pen-shaped input device 200 of one or more embodiments for tactile and writing sound feedback.

Step S400: In the pen-shaped input device 200, the communication unit 201 receives the contact speed transmitted from the information processing apparatus 100 in step S114 of FIG. 4 or step S314 of FIG. 6.

Step S402: In the pen-shaped input device 200, the vibration control unit 241 sets, on the basis of the contact speed received in step S400, a vibration intensity when vibrating the pen-shaped input device 200 in response to the time when the pen tip 210 comes into contact with the panel surface 1221.

Step S404: The sound output control unit 242 sets, also on the basis of the contact speed received in step S400, the volume (writing sound volume) of a writing sound to be output from the pen-shaped input device 200 in response to the time when the pen tip 210 comes into contact with the panel surface 1221.

Step S406: The vibration control unit 241 uses the vibration waveform data stored in the vibration waveform data storage unit 251 to drive the vibration unit 202 with the vibration intensity set in step S402.

Step S408: The sound output control unit 242 uses the writing sound data stored in the writing sound data storage unit 252 to cause the sound output unit 203 to output the writing sound at the writing sound volume set in step S404.

The tactile and writing sound feedback may be provided to the pen-shaped input device 200 in accordance with the movement of the pen tip 210 in the contact state with the panel surface 1221, although the corresponding processing is not shown in the figure.

It should be noted that the functions of the sound output unit 203 and the sound output control unit 242 may be provided in the information processing apparatus 100, so that the writing sound feedback is performed in the information processing apparatus.

As a modification of one or more embodiments, the application support processing unit 131 of the information processing apparatus 100 may perform drawing according to the writing operation, on the basis of the contact speed detected by the speed detection unit 105. More specifically, for example in a case where it is configured to perform drawing according to the writing operation performed using a brush or the like as a writing implement, when the contact speed is at or above a predetermined level, the drawing may be performed so as to resemble ink (or further, paint, India ink, or the like) splattering on the writing medium as the brush is made to contact the writing medium with great force.

In each of the above embodiments, the tactile feedback at the time of contact of the pen tip 210 with the panel surface 1221 may be configured to change, besides the vibration intensity, the vibration time, vibration waveform, and others in accordance with the contact speed.

Additional embodiments will now be described. In one or more embodiments, as the writing sound feedback, the information processing apparatus 100 is configured to be capable of outputting writing sounds, along with the output of writing sounds from the pen-shaped input device 200.

With the information processing apparatus 100 thus made capable of outputting writing sounds, the output of writing sounds from the information processing apparatus 100 is performed simultaneously with the output of writing sounds from the pen-shaped input device 200. Thus, the volume of the writing sounds can be increased, so that the writing sound feedback can be easily implemented with a sufficient volume of the writing sounds. For the output of writing sounds from the information processing apparatus 100, the volume of the writing sounds can be easily changed, thereby allowing the volume of the writing sounds to be adjusted, for example, so as to closely resemble the sensation of writing on a writing medium using an actual writing implement, or to suit the user's preferences.

Furthermore, with the information processing apparatus 100 enabled to output the writing sounds, even in a case where a user is using a pen-shaped input device that does not have the function of the writing sound feedback, the tactile and writing sound feedback can be implemented with the tactile feedback by vibrations of the pen-shaped input device and the writing sound feedback by the information processing apparatus 100.

In the following description of one or more embodiments, a case in which the pen-shaped input device is also configured to have the writing sound feedback function will be given as an example. In the following description of the present embodiment, a configuration in which the function of changing the vibration intensity or writing sound volume in accordance with the contact speed as in the previous embodiments is omitted will be given as an example.

Figure 9:
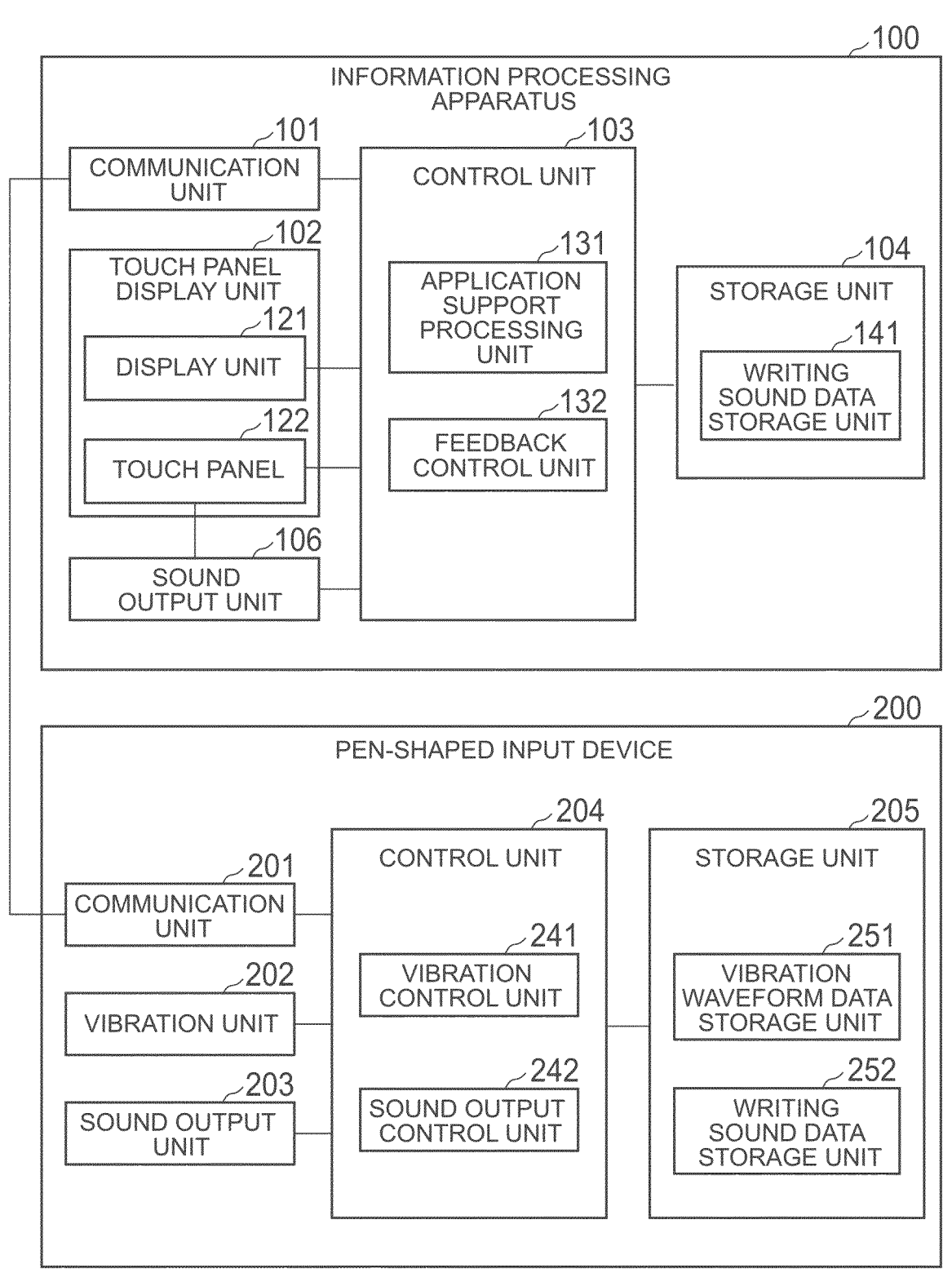
FIG. 9 shows an example of the functional configuration for tactile and writing sound feedback of the information processing apparatus and the pen-shaped input device in one or more embodiments.

FIG. 9 shows an example of the functional configuration of the information processing apparatus 100 and the pen-shaped input device 200 for tactile and writing sound feedback of one or more embodiments. In FIG. 9, the portions identical to those in FIG. 7 are designated by the same reference numerals and the description thereof is not repeated. The differences from FIG. 7 will be primarily described.

The information processing apparatus 100 of FIG. 9 is provided with a sound output unit 106. The sound output unit 106 includes, for example, an audio circuit and a speaker, and outputs writing sounds under the control of a feedback control unit 132 (an example of the sound output control unit). The sound output unit 106 may be configured to also be capable of outputting, for example, electronic sounds, voices, and other sounds.

In the information processing apparatus 100 of one or more embodiments, the control unit 103 includes the feedback control unit 132 (an example of the sound output control unit). The feedback control unit 132 performs control for the tactile and writing sound feedback. More specifically, the feedback control unit 132 controls the start and end of the tactile and writing sound feedback in the pen-shaped input device 200. The feedback control unit 132 also controls the writing sound feedback in the information processing apparatus 100 by inputting audio data, which is writing sound data stored in a writing sound data storage unit 141, into the sound output unit 106 to thereby cause the writing sound to be output from the sound output unit 106.

Figure 10:
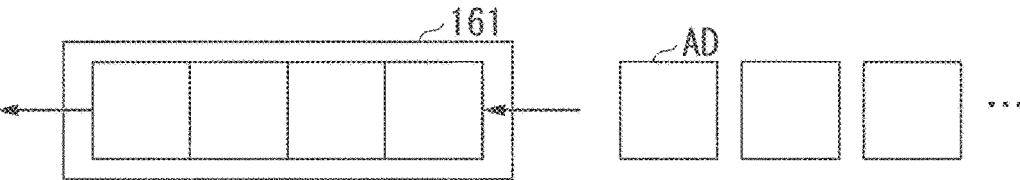
FIG. 10 illustrates a data input/output unit in one or more embodiments.

FIG. 10 illustrates a queue 161 provided in an internal circuit of the sound output unit 106. The queue 161 is configured to input sound data AD and output the data on a first-in-first-out (FIFO) basis, for example. In the sound output unit 106, the sound data output from the queue 161 may, for example, be converted to an analog sound signal by D/A conversion, amplified by an amplification circuit, and output as a sound from the speaker.

Returning to FIG. 9, in the information processing apparatus 100 of one or more embodiments, the storage unit 104 includes the writing sound data storage unit 141. The writing sound data storage unit 141 stores writing sound data.

The configuration of the pen-shaped input device 200 of one or more embodiments is identical to that of FIG. 7.

In the information processing apparatus 100 of one or more embodiments, as shown in FIG. 9, the speed detection unit 105 included in FIG. 7 may be omitted.

The sound output unit 106 included in the information processing apparatus 100 of one or more embodiments is set to a sleep mode while sound output processing is not being performed, for the sake of reducing power consumption. In other words, the sound output unit 106 is set to a sleep state while no sound data is being input, and is activated from the sleep state in response to the input of sound data to enter an operating state and start the sound output processing.

Figure 11:
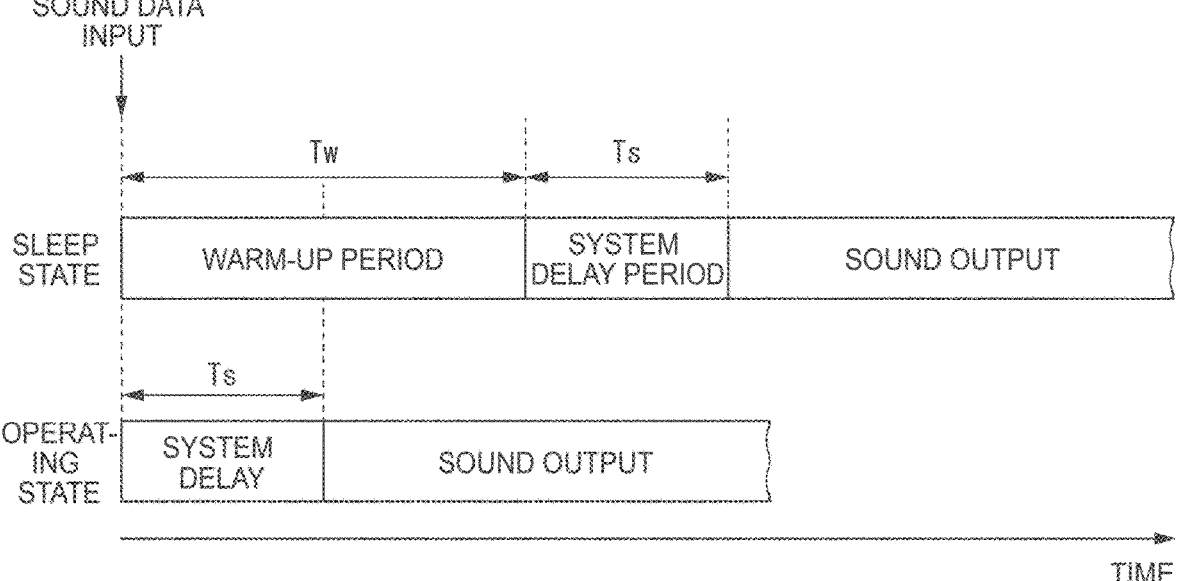
FIG. 11 illustrates latency in a sound output unit in one or more embodiments.

FIG. 11 illustrates an example of state transition of the sound output unit 106 in accordance with the input of sound data.

In a case where sound data is input while the sound output unit 106 is in a sleep state, first, there is a standby time (warm-up period Tw) for warming up. Then, after the warm-up period Tw has elapsed, there is a standby time (system delay period Ts) according to the signal processing in the sound output unit 106. The output of a sound is started after the system delay period Ts has elapsed. That is, in the case where sound data is input while the sound output unit 106 is in the sleep state, there is latency (delay) due to the warm-up period Tw and the system delay period Ts before the sound corresponding to the input sound data is output.

On the other hand, in a case where sound data is input while the sound output unit 106 is in an operating state after being activated from the sleep state, there is no warm-up period Tw. In this case, the output of a sound is started after the system delay period Ts. That is, in the case where the sound data is input while the sound output unit 106 is in the operating state, there is latency (delay) due to the system delay period Ts before the sound corresponding to the input sound data is output.

As described above, the latency generated from the time at which the sound data is input to the time at which the sound corresponding to the input sound data is output is longer in the sleep state than in the operating state.

For example, in the processing of outputting a writing sound in the information processing apparatus 100, it may be possible to cause the sound data to be input into the sound output unit 106 at the time when the contact of the pen tip of the pen-shaped input device 200 with the panel surface 1221 of the touch panel display unit 102 is detected. However, in such a configuration, the sound output unit 106 would be started from the sleep state at the time when the sound data is input. In this case, the sound corresponding to the sound data input into the sound output unit 106 is output after a relatively long delay due to the warm-up period Tw and the system delay period Ts. In this case, the user may hear the writing sound at a time somewhat delayed from when the pen tip of the pen-shaped input device 200 comes into contact with the panel surface 1221 of the touch panel display unit 102. Although the output of the writing sound may allow a user to experience a sensation similar to that of actually writing on a writing medium, the delay in the writing sound as described above will impair such a sensation.

Thus, the feedback control unit 132 of the information processing apparatus 100 of one or more embodiments is configured to shorten the delay in the writing sound output from the sound output unit 106 by performing control (sound output start control) for the start of the output of writing sound in the following manner.

Referring again to FIG. 3, the sound output start control in one or more embodiments will be described. When a user is to start writing using the pen-shaped input device 200, the user moves the pen tip of the pen-shaped input device 200 from a position outside the detectable range d1 (an example of the detection limit distance) to approach the panel surface 1221. During the process in which the pen tip of the pen-shaped input device 200 approaches the panel surface 1221, when the pen tip reaches the detectable range d1, detection of the pen tip is started on the touch panel 122.

In response to the start of detection of the pen tip, the feedback control unit 132 of the information processing apparatus 100 starts inputting silent sound data into the queue 161 of the sound output unit 106, as the sound output start control. The silent sound data is sound data corresponding to silence with a sound volume level of zero, for example.

With the input of the silent sound data, the sound output unit 106 is started from the sleep state and starts an operation from the warm-up period Tw shown in FIG. 11.

After a certain time elapses from the time when the detection of the pen tip is started as described above, the pen tip of the pen-shaped input device comes into contact with the panel surface 1221. When the contact of the pen tip with the panel surface 1221 is detected on the touch panel 122, the feedback control unit 132 switches the sound data to be entered into the queue 161 from the previous silent sound data to writing sound data (an example of the audible sound data) stored in the writing sound data storage unit 141.

By switching from the silent sound data to the writing sound data in this manner, the sound output unit 106 can be started from a timing before the pen tip of the pen-shaped input device 200 comes into contact with the panel surface 1221. Therefore, at the time when the pen tip contacts the panel surface 1221, the sound output unit 106 may have passed through the delay time due to the warm-up period Tw and the system delay period Ts and be in a state capable of outputting sounds. In this case, the sound output unit 106 outputs a writing sound for the writing sound data input at the time when the pen tip comes into contact with the panel surface 1221, without passing through a delay time. As a result, the user hardly feels a delay because the user can hear the writing sound output from the information processing apparatus 100 at the time when the pen tip comes into contact with the panel surface 1221.

There may be a case where the sound output unit 106 has not yet passed through the delay time due to the warm-up period Tw and the system delay period Ts at the time when the pen tip contacts the panel surface 1221. However, the writing sound can be output after a short delay time because a certain amount of the delay time (warm-up period Tw and system delay period Ts) has already elapsed at the time when the pen tip contacts the panel surface 1221. In this case, although the writing sound is output after a certain delay time from the time when the pen tip contacts the panel surface 1221, such a short delay time is hardly noticed by the user's auditory perception, or even if it is noticed, the user is unlikely to feel uncomfortable.

In this manner, in one or more embodiments, the delay in the writing sound output from the information processing apparatus 100 is eliminated or alleviated. As a result, while the user is writing using the pen-shaped input device 200, it is possible to avoid losing the sensation similar to that of actually writing on a writing medium.

An exemplary processing procedure performed for tactile and writing sound feedback by the information processing apparatus 100 and the pen-shaped input device 200 of one or more embodiments will be described with reference to the flowchart of FIG. 12.

First, an exemplary processing procedure performed by the information processing apparatus 100 will be described.

Step S500: In the information processing apparatus 100, the feedback control unit 132 waits for a state in which the detection of the pen tip 210 by the touch panel 122 is started (an example of the first state) to be reached. As in the processing in step S100 of FIG. 4, the feedback control unit 132 may determine that the detection of the pen tip 210 has been started in response to a capacitance being generated on the touch panel 122 in response to the pen tip 210 reaching the detectable range d1 (time t1 in FIG. 3) and the output of a detection signal according to the generated capacitance being started.

Step S502: When it is determined in step S500 that the detection of the pen tip 210 by the touch panel 122 has been started, the feedback control unit 132 starts inputting silent sound data into the queue 161 of the sound output unit 106 in the sleep state. The sound output unit 106 is started in response to the start of the input of the silent sound data.

Step S504: After the input of the silent sound data into the queue 161 is started in step S502, the feedback control unit 132 waits for a state in which the pen tip has come into contact with the panel surface 1221 (an example of the second state) to be detected on the touch panel 122.

It should be noted that if the pen tip moves out of the detectable range d1 without contacting the panel surface 1221 and the pen tip is no longer detected in step S504, the feedback control unit 132 may stop inputting the previous silent sound data and return the process to step S500. In this case, the sound output unit 106 may move to the sleep state in response to the stopping of the input of the silent sound data.

Step S506: When it is detected in step S504 that the pen tip has come into contact with the panel surface 1221, the feedback control unit 132 starts inputting writing sound data stored in the writing sound data storage unit 141 into the queue 161, instead of the previous silent sound data.

Step S508: In response to the detection in step S504 that the pen tip has come into contact with the panel surface 1221, the feedback control unit 132 transmits a feedback start instruction to the pen-shaped input device 200. The feedback start instruction is a command that instructs the pen-shaped input device 200 to start the operation of the tactile and writing sound feedback.

Step S510: After the processing in steps S506 and S508, the feedback control unit 132 waits for a state in which the pen tip has been separated from the panel surface 1221 (an example of the third state) to be detected on the touch panel 122.

Step S512: In response to the detection in step S510 that the pen tip has been separated from the panel surface 1221, the feedback control unit 132 stops inputting the writing sound data to the queue 161 that was started in step S506. The sound output unit 106 makes a transition to the sleep state in response to the stopping of the input of the writing sound data.

Step S514: In response to the detection in step S510 that the pen tip has been separated from the panel surface 1221, the feedback control unit 132 transmits a feedback stop instruction to the pen-shaped input device 200. The feedback stop instruction is a command that instructs the pen-shaped input device 200 to stop the operation of the tactile and writing sound feedback.

Next, an exemplary processing procedure performed by the pen-shaped input device 200 will be described.

Step S600: In the pen-shaped input device 200, the control unit 204 receives the feedback start instruction transmitted from the information processing apparatus 100 in step S508.

Step S602: In response to receiving the feedback start instruction in step S600, the vibration control unit 241 starts vibration of the vibration unit 202 with, for example, a predetermined vibration intensity.

Step S604: Further, in response to receiving the feedback start instruction in step S600, the sound output control unit 242 starts outputting the writing sound by inputting the writing sound data stored in the writing sound data storage unit 252 to the sound output unit 203.

With the processing in steps S602 and S604 performed in the above-described manner, the operation of the tactile and writing sound feedback is started in the pen-shaped input device 200 at the timing that can be regarded as the same as the timing at which the pen tip of the pen-shaped input device 200 contacts the panel surface 1221.

Step S606: At some time after the operation of the tactile and writing sound feedback is started in steps S602 and S604, the control unit 204 receives the feedback stop instruction transmitted from the information processing apparatus 100 in step S514.

Step S608: In response to receiving the feedback stop instruction, the vibration control unit 241 stops driving the vibration unit 202.

Step S610: Further, in response to receiving the feedback stop instruction, the sound output control unit 242 stops outputting the writing sound from the sound output unit 203.

Figure 12:
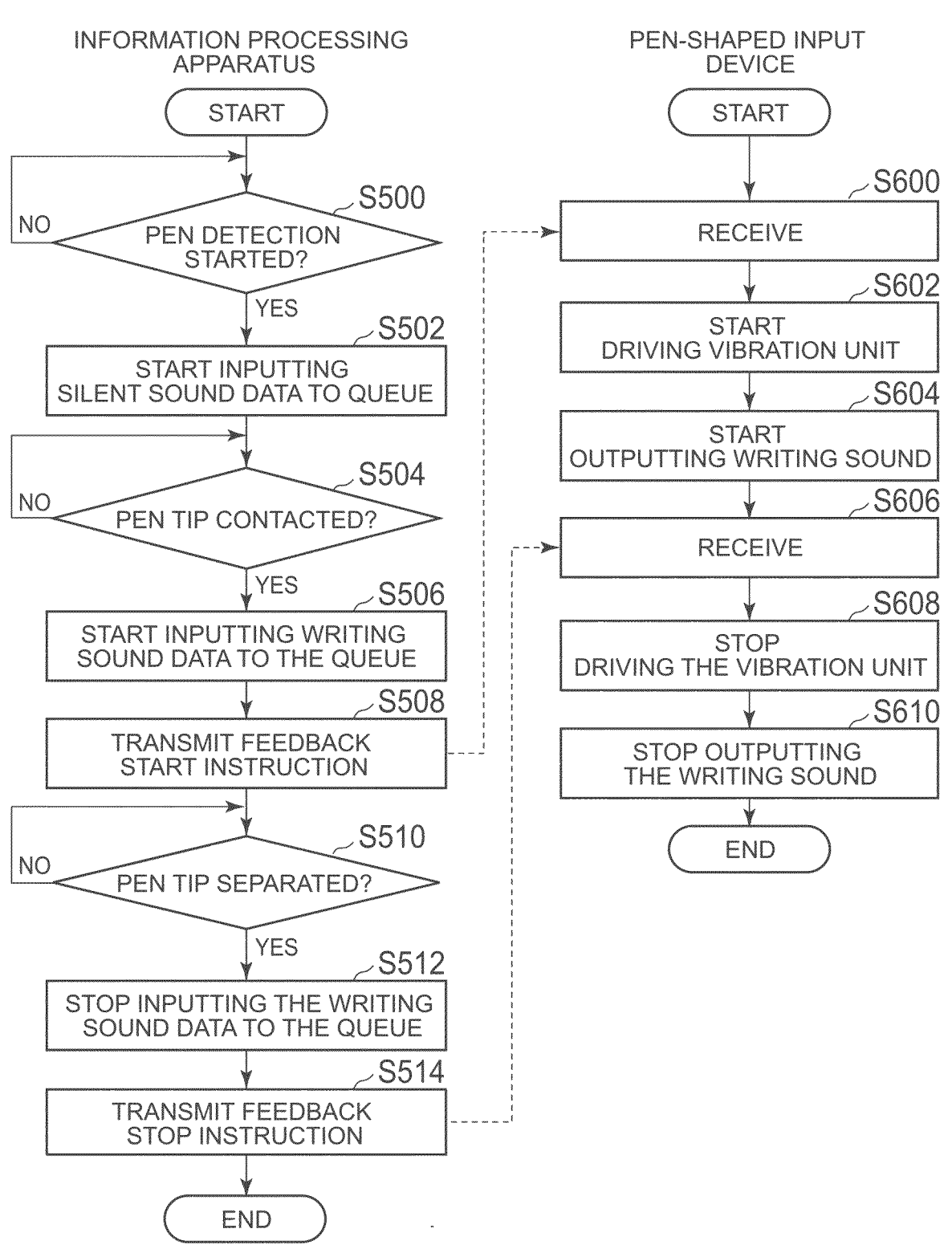
FIG. 12 is a flowchart illustrating an exemplary processing procedure performed for tactile and writing sound feedback by the information processing apparatus and the pen-shaped input device in one or more embodiments.

According to the above-described processing of FIG. 12, when the separation of the pen tip of the pen-shaped input device 200 from the panel surface 1221 is detected in step S510, the writing sound feedback of the information processing apparatus 100 and the tactile and writing sound feedback of the pen-shaped input device 200 are immediately stopped by the processing in steps S512 and S514.

However, while the user is continuing to write, there may be a case, depending on the content of the writing, where the user briefly separates the pen tip from the panel surface 1221 and then immediately brings the pen tip back into contact with the panel surface 1221. Under such circumstances, if the writing sound feedback of the information processing apparatus 100 and the tactile and writing sound feedback of the pen-shaped input device 200 are stopped each time the pen tip is separated from the panel surface 1221, the user may feel rather uncomfortable and the sensation similar to that of actually writing on a writing medium may be impaired. In other words, in a situation in which the time during which the pen tip of the pen-shaped input device 200 is separated from the panel surface 1221 is short, the writing sound feedback of the information processing apparatus 100 and the tactile and writing sound feedback of the pen-shaped input device 200 may be continued.

Thus, as a modification of one or more embodiments, step S510 may be configured to determine whether the pen tip of the pen-shaped input device 200 has been continuously separated from the panel surface 1221 for a predetermined period of time or more.

According to such processing, in a situation in which the user is writing in such a manner that the pen tip of the pen-shaped input device 200, once separated from the panel surface 1221, is immediately brought into contact with the panel surface 1221, the writing sound feedback of the information processing apparatus 100 and the tactile and writing sound feedback of the pen-shaped input device 200 are continued. This makes it less likely that the user will feel uncomfortable, and also makes it less likely that the sensation similar to that of actually writing on a writing medium will be impaired.

It should be noted that the processing as the information processing apparatus 100, the pen-shaped input device 200, and others as described above may be performed by recording a program for implementing the functions of the information processing apparatus 100, the pen-shaped input device 200, and others as described above on a computer-readable recording medium, and causing a computer system to read and execute the program recorded on the recording medium. Herein, "causing a computer system to read and execute the program recorded on the recording medium" includes installing the program in the computer system. The "computer system" herein includes an OS and hardware such as peripherals. The "computer system" may include a plurality of computer devices connected via a network such as the Internet, a WAN, a LAN, or a communication line such as a dedicated line. The "computer-readable recording medium" refers to a portable medium such as a flexible disk, a magneto-optical disc, a ROM, or a CD-ROM, or a storage device incorporated in the computer system, such as an HDD or an SSD. Thus, the recording medium having the program recorded thereon may be a non-transitory recording medium such as the CD-ROM. The recording medium also includes an internally or externally provided recording medium that a distribution server can access to distribute the program. The code of the program stored in the recording medium of the distribution server may be different from the code of the program in a format executable on a terminal device. That is, the format in which the program is stored in the distribution server is not restricted, as long as it can be downloaded from the distribution server and installed in a form executable on the terminal device. The program may be divided into a plurality of pieces, which may be downloaded at different times and combined in the terminal device. Alternatively, different distribution servers may distribute these divided pieces of the program. The "computer-readable recording medium" also includes the one that holds a program for a certain period of time, such as a volatile memory (RAN) within a computer system that serves as a server or a client when the program is transmitted over a network. The program may be one that implements some of the functions described above. The program may be one, a so-called differential file (differential program), that can implement the above functions in combination with a program already recorded in the computer system.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF SYMBOLS

100 information processing apparatus
101 communication unit
102 touch panel display unit
103 control unit
104 storage unit
105 speed detection unit
106 sound output unit
121 display unit
122 touch panel
131 application support processing unit
132 feedback control unit
141 writing sound data storage unit
161 queue
200 pen-shaped input device
201 communication unit
202 vibration unit
203 sound output unit
204 control unit
205 storage unit
210 pen tip
241 vibration control unit
242 sound output control unit
251 vibration waveform data storage unit
252 writing sound data storage unit
1221 panel surface

What is claimed is:

1. An information processing system comprising:
a sensor unit that performs detection of contact of a pen-shaped input device with an operation target surface and presence of the pen-shaped input device within a detection limit distance on the operation target surface;
a sound output unit that outputs a sound corresponding to input sound data and that includes:
a sleep state that requires a warm-up period before outputting the sound; and
an operating state that does not require a warm-up period before outputting the sound; and
a sound output control unit that
inputs silent sound data to the sound output unit in response to the sensor unit detecting a first state in which the pen-shaped input device is detected within the detection limit distance, wherein the silent sound data causes the sound output unit to start the warm-up period before the pen-shaped input device is in contact with the operation target surface, and
inputs audible sound data to the sound output unit in response to the sensor unit detecting that, after the first state, a second state in which the pen-shaped input device is in contact with the operation target surface has been reached.

2. The information processing system according to claim 1, wherein
the sound output control unit stops inputting the sound data to the sound output unit in response to the sensor unit detecting a transition from the second state to a third state in which the pen-shaped input device is separated from the operation target surface.

3. The information processing system according to claim 2, wherein the sound output control unit stops inputting the sound data to the sound output unit in response to the third state having continued for a predetermined period of time from a time of the transition from the second state to the third state.

* * * * *